(12) United States Patent
Nishida

(10) Patent No.: US 12,097,780 B2
(45) Date of Patent: Sep. 24, 2024

(54) POWER SUPPLY/RECEPTION MATCHING DEVICE, POWER SUPPLY/RECEPTION MATCHING METHOD, AND PROGRAM

(71) Applicant: HONDA MOTOR CO., LTD., Tokyo (JP)

(72) Inventor: Yoshikazu Nishida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 581 days.

(21) Appl. No.: 17/424,183

(22) PCT Filed: Jan. 6, 2020

(86) PCT No.: PCT/JP2020/000050
§ 371 (c)(1),
(2) Date: Jul. 20, 2021

(87) PCT Pub. No.: WO2020/153107
PCT Pub. Date: Jul. 30, 2020

(65) Prior Publication Data
US 2022/0105825 A1 Apr. 7, 2022

(30) Foreign Application Priority Data
Jan. 25, 2019 (JP) ................ 2019-011591

(51) Int. Cl.
*B60L 53/65* (2019.01)
*B60L 53/30* (2019.01)
*H02J 7/00* (2006.01)
(52) U.S. Cl.
CPC ............ *B60L 53/65* (2019.02); *B60L 53/305* (2019.02); *H02J 7/00036* (2020.01); *H02J 7/00047* (2020.01)

(58) Field of Classification Search
CPC ........ B60L 53/305; B60L 53/65; B60L 53/36; H02J 7/0047
See application file for complete search history.

(56) References Cited

U.S. PATENT DOCUMENTS 11,797,069 B2 * 10/2023 Nishizaka ............... G06F 1/263
2012/0109409 A1 * 5/2012 Hara ....................... B60L 53/16
701/1

(Continued)

FOREIGN PATENT DOCUMENTS

CN          108431787       8/2018
JP          2012-108870     6/2012

(Continued)

OTHER PUBLICATIONS

Chinese Office Action for Chinese Patent Application No. 202080009721.2 mailed Jun. 27, 2023.

(Continued)

*Primary Examiner* — Richard V Muralidar
(74) *Attorney, Agent, or Firm* — Amin, Turocy & Watson, LLP

(57) ABSTRACT

A power supply/reception matching device includes a communicator, an acquirer configured to acquire a power reception request or a power supply request including information for identifying a type and a charge rate of a battery through the communicator, a matching processor configured to match a power supplying vehicle and a power receiving vehicle on the basis of the power reception request and the power supply request acquired by the acquirer, and a guider configured to cause the communicator to transmit a processing result from the matching process to devices of transmitters of the power reception request and the power supply request.

7 Claims, 10 Drawing Sheets

(56) References Cited

U.S. PATENT DOCUMENTS

2018/0375374 A1   12/2018  Ito et al.
2021/0284128 A1*  9/2021  Nishida ................. B60W 20/20
2022/0305946 A1*  9/2022  Kitamoto .............. B60L 53/665

FOREIGN PATENT DOCUMENTS

| JP | 2012-200043 | 10/2012 |
| JP | 2013-130963 | 7/2013 |
| JP | 2013-192285 | 9/2013 |
| JP | 2018-049399 | 3/2018 |
| WO | 2013/061410 | 5/2013 |
| WO | 2018/056273 | 3/2018 |

OTHER PUBLICATIONS

International Search Report and Written Opinion for International Application No. PCT/JP2020/000050 mailed on Mar. 17, 2020, 8 pages.

* cited by examiner

FIG. 3

USER INFORMATION 162

| USER ID | REQUEST DETAILS | BATTERY TYPE INFORMATION | BATTERY CHARGE RATE [%] |
|---|---|---|---|
| 0001 | POWER RECEPTION | AAAA | XX |
| 0002 | POWER SUPPLY | BBBB | YY |
| 0003 | — | CCCC | ZZ |
| ... | ... | ... | ... |

FIG. 4

BATTERY-RELATED INFORMATION 164

| BATTERY TYPE INFORMATION | MATERIAL OF BATTERY | MATERIAL OF BATTERY THAT CAN RECEIVE POWER | MATERIAL OF BATTERY THAT CAN SUPPLY POWER |
|---|---|---|---|
| AAAA | MATERIAL 1 | MATERIAL 1, MATERIAL 3 | MATERIAL 1, MATERIAL 2 |
| BBBB | MATERIAL 2 | MATERIAL 2, MATERIAL 4 | MATERIAL 1, MATERIAL 2 |
| ... | ... | ... | ... |

FIG. 11

USER INFORMATION 162a

| USER ID | REQUEST DETAILS | POSITION INFORMATION | VEHICLE TYPE INFORMATION | BATTERY TYPE INFORMATION | BATTERY CHARGE RATE [%] | OFFERED FEE |
|---|---|---|---|---|---|---|
| 0001 | POWER RECEPTION | (**, **) | +++ | AAAA | XX | — |
| 0002 | POWER SUPPLY | (**, **) | +++ | BBBB | YY | — |
| 0003 | — | (**, **) | +++ | CCCC | ZZ | — |
| ... | ... | ... | ... | ... | ... | ... |

LIST OF POWER SUPPLYING VEHICLES

| VEHICLE ID | LOCATION INFORMATION | VEHICLE TYPE INFORMATION | OFFERED FEE | |
|---|---|---|---|---|
| VEHICLE 0001 | XXX | +++ | — | SELECT — B |

POWER SUPPLY/RECEPTION MATCHING DEVICE, POWER SUPPLY/RECEPTION MATCHING METHOD, AND PROGRAM

TECHNICAL FIELD

The present invention relates to a power supply/reception matching device, a power supply/reception matching method, and a program.

Priority is claimed based on Japanese Patent Application No. 2019-011591 filed on Jan. 25, 2019, the content of which is incorporated herein by reference.

BACKGROUND ART

A technology in the related art that enables an electric vehicle to communicate with a power supply facility that supplies power to the storage battery of the electric vehicle to present a power supply facility located in the range in which the electric vehicle can travel to the driver of the electric vehicle is known (refer to Patent Document 1).

CITATION LIST

Patent Document

Patent Document 1

Japanese Unexamined Patent Application, First Publication No. 2013-192285

SUMMARY OF INVENTION

Technical Problem

However, in the technology of the related art, an electric vehicle that needs supply of power needs to move to a power supply facility, which is inconvenient.

The present invention has been conceived taking the above circumstance into account, and an objective of the present invention is to provide a power supply/reception matching device, a power supply/reception matching method, and a program that can improve convenience in receiving supply of power.

Solution to Problem

A power supply/reception matching device according to the present invention employs the following configurations.

(1) A power supply/reception matching device according to an aspect of the present invention is a power supply/reception matching device including a communicator, an acquirer configured to acquire a power reception request or a power supply request including information for identifying a type and a charge rate of a battery through the communicator, a matching processor configured to match a power supplying vehicle and a power receiving vehicle on the basis of the power reception request and the power supply request acquired by the acquirer, and a guider configured to cause the communicator to transmit a processing result from the matching process to devices of transmitters of the power reception request and the power supply request.

(2) According to the aspect (1) described above, the guider is configured to cause the communicator to transmit information for viewing a list of power supplying vehicles to the device of the transmitter of the power supply request.

(3) According to the aspect (1) or (2) described above, the guider is configured to cause the communicator to transmit information for viewing profile information of power supplying vehicles to the device of the transmitter of the power supply request.

(4) According to any one of the aspects (1) to (3) described above, the matching process is configured to match a power supplying vehicle and a power receiving vehicle further on the basis of position information of the power receiving vehicle and position information of the power supplying vehicle.

(5) According to any one of the aspects (1) to (4) described above, the power reception request includes information indicating an offered fee for electric power to be received and the power supply request includes information indicating an offered fee for electric power to be supplied, and the matching process is configured to match the power supplying vehicle and the power receiving vehicle further on the basis of the offered fee for electric power to be received included in the power reception request and the offered fee for electric power to be supplied included in the power supply request.

(6) A power supply/reception matching method according to an aspect of the present invention is a power supply/reception matching method of a device including a communicator, the power supply/reception matching method including acquiring a power reception request or a power supply request including information for identifying a type and a charge rate of a battery through the communicator, matching a power supplying vehicle and a power receiving vehicle on the basis of the acquired power reception request and power supply request, and causing the communicator to transmit a processing result from the matching to devices of transmitters of the power reception request and the power supply request.

(7) A program according to an aspect of the present invention is a program causing a computer of a device including a communicator to acquire a power reception request or a power supply request including information for identifying a type and a charge rate of a battery through the communicator, match a power supplying vehicle and a power receiving vehicle on the basis of the acquired power reception request and power supply request, and cause the communicator to transmit a processing result from the matching to devices of transmitters of the power reception request and the power supply request.

Advantageous Effects of Invention

According to (1) to (7), because a result from matching of a power supplying vehicle and a power receiving vehicle on the basis of a power reception request and a power supply request can be transmitted to devices of transmitters of the power reception request and the power supply request, convenience in receiving supply of power can be improved.

BRIEF DESCRIPTION OF DRAWINGS

FIG. 3 is a diagram showing an example of user information.

FIG. 4 is a diagram showing an example of battery-related information.

FIG. 11 is a diagram showing an example of user information.

FIG. 12 is a diagram showing an example of a list of power supplying vehicles.

DESCRIPTION OF EMBODIMENTS

Figure 1:
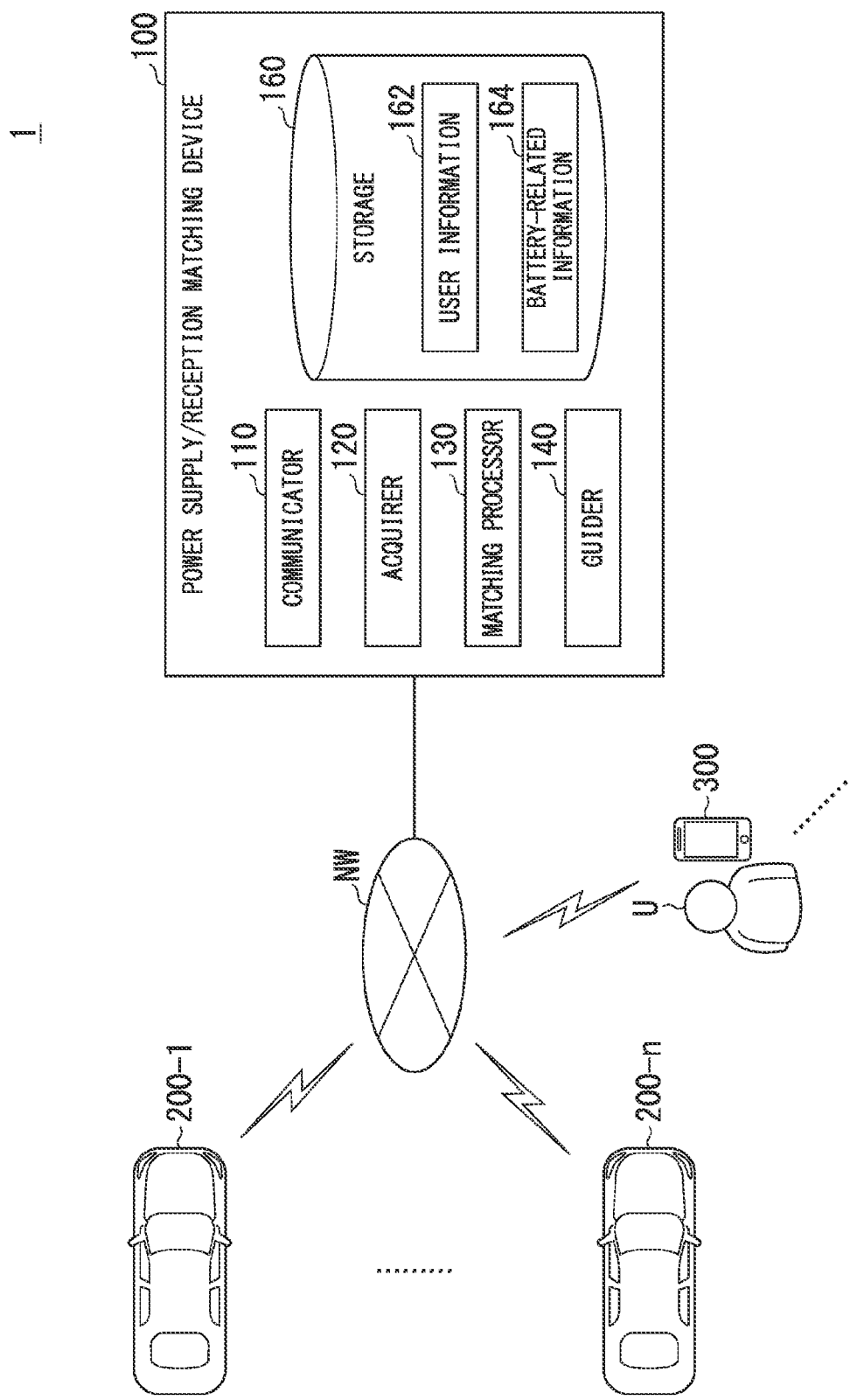
FIG. 1 is a configuration diagram of a vehicle system including a power supply/reception matching device according to an embodiment.

Embodiments of a power supply/reception matching device, a power supply/reception matching method, and a program of the present invention will be described below with reference to the drawings.

Further, the same reference numerals are used for constituent elements having the same functions in all of the drawings for describing the embodiments, and repetitive description thereof will be omitted.

In addition, "on the basis of XX" in the present specification means "on the basis of at least XX" including being on the basis of another element in addition to "XX." In addition, "on the basis of XX" is not limited to a case in which XX is directly used, and also includes those in which XX is arithmetically calculated or processed. "XX" is any element (e.g., any information).

(Embodiment)
[Overall Configuration]

FIG. 1 is a configuration diagram of a vehicle system including a power supply/reception matching device according to an embodiment.

The vehicle system 1 according to the embodiment includes a power supply/reception matching device 100, a vehicle 200-1 to a vehicle 200-*n* (n is an integer satisfying n>1), and one or more terminal devices 300 used by one or more users U. "Used by a user U" indicates a case in which a terminal device that can be used by an unspecified number of people, such as a terminal device in an Internet cafe, is temporarily used by a user U may be included.

The power supply/reception matching device 100, each of the vehicle 200-1 to vehicle 200-*n*, and the one or more terminal devices 300 can communicate with one another via a network NW. The network NW includes the Internet, a wide area network (WAN), a local area network (LAN), a public line, a provider device, a dedicated line, a radio base station, and the like.

The power supply/reception matching device 100 is a device that matches a vehicle requesting power reception (which will also be referred to as a "power receiving vehicle" below) and a vehicle requesting power supply (which will also be referred to as a "power supplying vehicle" below) among the vehicle 200-1 to the vehicle 200-*n*.

The power receiving vehicle transmits a power reception request including a user ID, information indicating that power reception is being requested, battery type information, and information for identifying a state of charge (SOC; which will also be referred to as a "battery charge rate" below). Information for identifying a battery charge rate includes the current value, the voltage value, and the temperature of a battery 40 detected by a battery sensor 42, which will be described below.

The power supplying vehicle transmits a power supply request including a user ID, information indicating a request for power supply, battery type information, and information for identifying a battery charge rate.

A terminal device 300 accesses the power supply/reception matching device 100 and logs into the power supply/reception matching website presented by the power supply/reception matching device 100 using its user ID. The power supply/reception matching device 100 is a server that is accessible through an application and functions as an application server or a web server. The terminal device 300 transmits a power reception request including a user ID and information indicating a request for power reception or a power supply request including a user ID and information indicating a request for power supply.

The power supply/reception matching device 100 receives a power reception request transmitted by a power receiving vehicle, a power supply request transmitted by the power supplying vehicle, and a power reception request or a power supply request transmitted by the terminal device 300.

The power supply/reception matching device 100 acquires the battery type information and the information for identifying a battery charge rate included in the power reception request transmitted by the power receiving vehicle, the battery type information and the information for identifying a battery charge rate included in the power supply request transmitted by the power supplying vehicle, and the battery type information and the information for identifying a battery charge rate of the power receiving vehicle acquired based on the user ID included in the power reception request or the battery type information and the information for identifying a battery charge rate of the power supplying vehicle acquired based on the user ID included in the power supply request, the requests being transmitted by the terminal device 300.

The power supply/reception matching device 100 processes matching of the power receiving vehicle and the power supplying vehicle based on the acquired information. The power supply/reception matching device 100 transmits the processing result of the matching of the power receiving vehicle and the power supplying vehicle to devices of the transmitters of the power reception request and the power supply request.

The terminal device 300, the vehicle 200-1 to the vehicle 200-*n*, and the power supply/reception matching device 100 included in the vehicle system 1 will be described in order below. An arbitrary vehicle among the vehicle 200-1 to the vehicle 200-*n* will be denoted by a vehicle 200.

[Terminal Device]

The terminal device 300 is, for example, a smartphone, a tablet terminal, a personal computer, or the like. An application program or a browser of the terminal device 300 for using a power supply/reception matching system is activated to support services which will be described below. It is assumed in the following description that the terminal device 300 is a smartphone and an application program (a power supply/reception matching app) is active. The power supply/reception matching app communicates with the power supply/reception matching device 100 according to an operation of the user U, transmits a request of the user U to the power supply/reception matching device 100, or gives a push notification based on information received from the power supply/reception matching device 100.

[Vehicle]

A vehicle 200 included in the vehicle system 1 is, for example, a two-wheeled, three-wheeled, or four-wheeled vehicle.

The vehicle 200 is equipped at least with a storage battery and is assumed to be an electric automobile that drives electric power stored in the storage battery and an electric motor to travel or a hybrid vehicle that can be driven by an electric motor and receives power supply from the outside.

Figure 2:
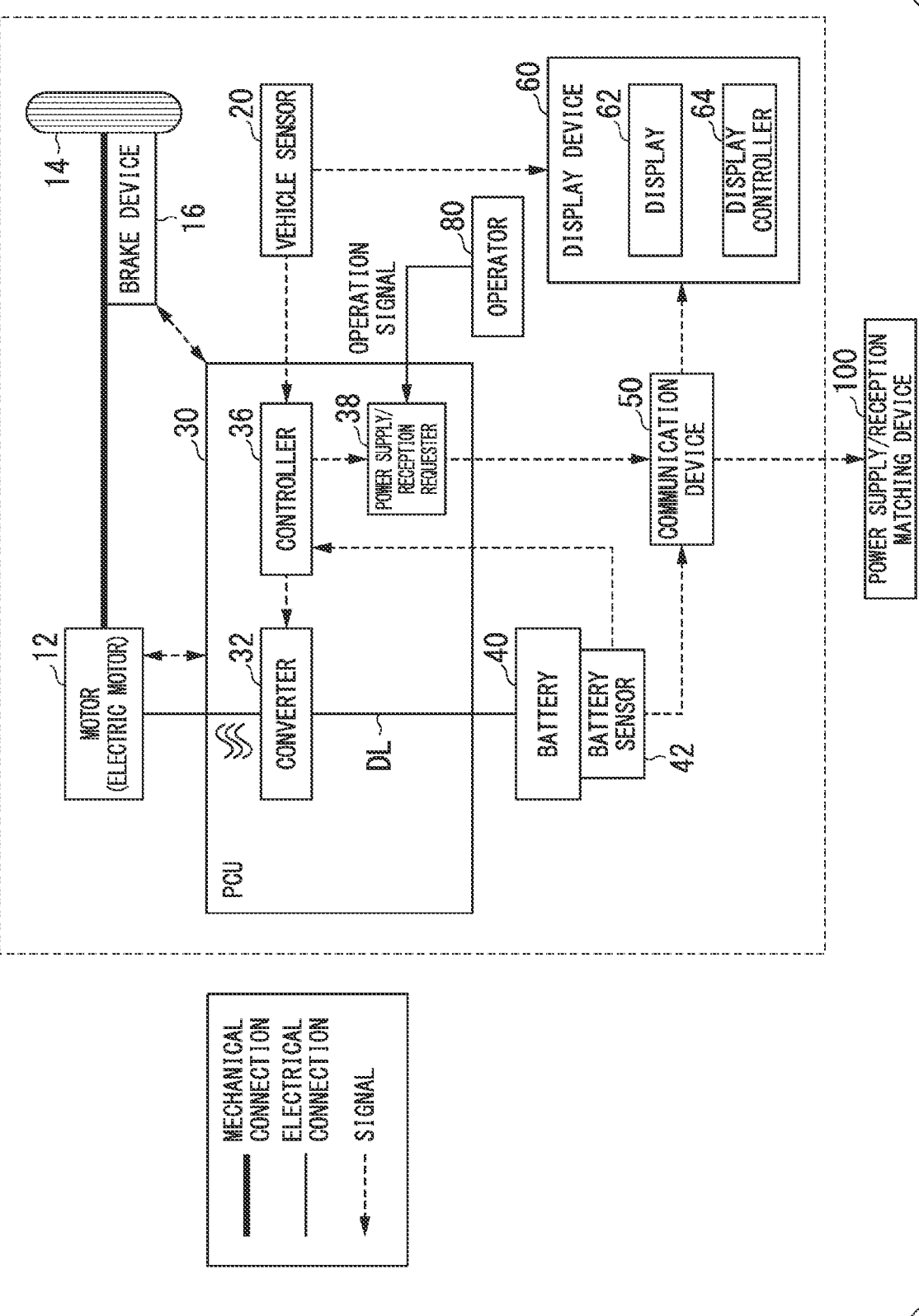
FIG. 2 is a diagram showing an example of a configuration of a vehicle according to an embodiment.

FIG. 2 is a diagram showing an example of a configuration of the vehicle according to an embodiment. The vehicle 200 includes, for example, a motor 12, a drive wheel 14, a brake device 16, a vehicle sensor 20, a power control unit (PCU) 30, a battery 40, a battery sensor 42 including a voltage sensor, a current sensor, a temperature sensor, and the like, a communication device 50, a display device 60, and an operator 80 as shown in FIG. 2.

The motor 12 is, for example, a three-phase AC motor. A rotor of the motor 12 is connected to the drive wheel 14. The motor 12 outputs motive power to the drive wheel 14 using supplied electric power. The motor 12 generates electric power using kinetic energy of the vehicle at the time of deceleration of the vehicle.

The brake device 16 includes, for example, a brake caliper, a cylinder that transmits oil pressure to the brake caliper, and an electric motor that causes oil pressure to be generated in the cylinder. The brake device 16 may include, as a backup, a mechanism that transmits oil pressure generated due to an operation of the brake pedal to the cylinder via a master cylinder. The brake device 16 is not limited to the above-described configuration and may be an electronically controlled oil pressure brake device that transmits oil pressure of the master cylinder to a cylinder.

The vehicle sensor 20 includes an accelerator opening degree sensor, a vehicle speed sensor, and a brake depression amount sensor. The accelerator opening degree sensor is attached to the accelerator pedal that is an example of an operator that receives acceleration instructions from the driver, detects an operation amount of the accelerator pedal, and outputs the detected operation amount of the accelerator pedal as an accelerator opening degree to a controller 36. The vehicle sensor, for example, includes a wheel speed sensor and a speed calculator attached to each wheel, calculates a speed of the vehicle (vehicle speed) by integrating wheel speeds detected by the wheel speed sensors, and outputs the result to the controller 36 and the display device 60. The brake depression amount sensor is attached to the brake pedal, detects an operation amount of the brake pedal, and outputs the detected operation amount of the brake pedal as a brake depression amount to the controller 36.

The PCU 30 includes, for example, a converter 32, the controller 36, and a power supply/reception requester 38.

The configuration in which these constituent elements are combined as the PCU 30 is merely an example, and these constituent elements may be disposed in a distributed manner.

The converter 32 is, for example, an AC-DC converter. A DC side terminal of the converter 32 is connected to a DC link DL. The DC link DL is connected to the battery 40. The converter 32 converts AC generated by the motor 12 into DC and outputs the DC to the DC link DL.

The controller 36 includes, for example, a motor controller, a brake controller, and a battery controller. The motor controller, the brake controller, and the battery controller may be replaced with separate control devices, respectively, for example, control devices including a motor ECU, a brake ECU, a battery ECU, and the like.

The motor controller controls the motor 12 based on an output of the vehicle sensor 20. The brake controller controls the brake device 16 based on an output of the vehicle sensor 20. The battery controller calculates a battery charge rate of the battery 40 based on an output of the battery sensor 42 attached to the battery 40 and outputs the calculation result of the battery charge rate of the battery 40 to the power supply/reception requester 38 and the display device 60. The power supply/reception requester 38 acquires the calculation result of the battery charge rate of the battery 40 output by the battery controller.

The power supply/reception requester 38 acquires the acquired calculation result of the battery charge rate of the battery 40 and periodically creates battery charge rate notification information including the acquired calculation result of the battery charge rate and the user ID destined for the power supply/reception matching device 100. The power supply/reception requester 38 outputs the created battery charge rate notification information to the communication device 50.

When the user U of the vehicle 200 performs an operation to request power reception on the operator 80 of the vehicle 200, the operator 80 outputs an operation signal including information of the request for power reception (which will be referred to as a "power reception request signal" below) to the power supply/reception requester 38. When the user U of the vehicle 200 performs an operation to request power supply on the operator 80 of the vehicle 200, the operator 80 outputs an operation signal including information of the request for power supply (which will be referred to as a "power supply request signal" below) to the power supply/reception requester 38.

Upon acquiring the power reception request signal output by the operator 80, the power supply/reception requester 38 creates a power reception request destined for the power supply/reception matching device 100, the request including the user ID, information indicating the request for power reception, battery type information, and information for identifying the battery charge rate. The power supply/reception requester 38 outputs the created power reception request to the communication device 50.

Upon acquiring the power supply request signal output by the operator 80, the power supply/reception requester 38 creates a power supply request destined for the power supply/reception matching device 100, the request including the user ID, information indicating the request for power supply, battery type information, and information for identifying the battery charge rate. The power supply/reception requester 38 outputs the created power supply request to the communication device 50.

The battery 40 is a secondary battery, for example, a lithium-ion battery, or the like. The battery 40 stores electric power introduced from an external charger or another vehicle and discharges electric power for traveling of the vehicle 10.

The battery sensor 42 includes sensors, for example, a current sensor, a voltage sensor, a temperature sensor, and the like. The battery sensor 42 detects, for example, a current value, a voltage value, and a temperature of the battery 40. The battery sensor 42 outputs battery use status information including the detected current value, voltage value, temperature, and the like to the controller 36. The battery sensor 42 may include a plurality of sensors including current sensors, voltage sensors, temperature sensors, and the like. If the battery sensor 42 includes a plurality of sensors, battery use status information may include battery sensor identifiers. Each battery sensor identifier is an identifier with which the plurality of sensors included in the vehicle 200 can be identified. The battery sensor identifiers may be represented by, for example, predetermined alphanumeric characters.

The communication device 50 includes a wireless module to be connected to the Internet, a WAN, a LAN, a public line, a provider device, a dedicated line, a radio base station, or the like.

The communication device 50 acquires the battery charge rate notification information, the power reception request, and the power supply request output from the power supply/reception requester 38 and transmits the acquired battery charge rate notification information, power reception request, and power supply request to the power supply/reception matching device 100 via the network NW shown in FIG. 1.

The communication device 50 receives notification information transmitted from the power supply/reception matching device 100 via the network NW. The communication device 50 outputs the received notification information to the display device 60.

The display device 60 includes, for example, a display 62 and a display controller 64. The display 62 displays information according to control of the display controller 64. The display controller 64 causes the display 62 to display a battery charge rate according to information output from the vehicle sensor 20. The display controller 64 causes the display 62 to display a matching processing result (a list of power supplying vehicles and a power receiving vehicle) and the like according to information output from the communication device 50. Returning to FIG. 1, description will be continued.

[Power Supply/Reception Matching Device 100]

The power supply/reception matching device 100 is realized by a device such as a personal computer, a server, an industrial computer, or the like. The power supply/reception matching device 100 includes, for example, a communicator 110, an acquirer 120, a matching processor 130, a guider 140, and a storage 160.

The communicator 110 is realized by a communication module. Specifically, the communicator 110 is configured by a device that performs wired communication. The communicator 110 may be configured by a wireless device that performs wireless communication using a wireless communication technology such as LTE or a wireless LAN. The communicator 110 communicates with the terminal device 300 and the communication device 50 included in the vehicle 200 via the network N.

Specifically, the communicator 110 receives a power reception request or a power supply request transmitted by the terminal device 300 and outputs the received power reception request or power supply request to the acquirer 120. The communicator 110 receives battery charge rate notification information transmitted by the communication device 50 of a vehicle 200 and outputs the received battery charge rate notification information to the acquirer 120. The communicator 110 receives a power reception request transmitted by the communication device 50 of a vehicle 200 and outputs the received power reception request to the acquirer 120. The communicator 110 receives a power supply request transmitted by the communication device 50 of a vehicle 200 and outputs the received power supply request to the acquirer 120. The communicator 110 acquires notification information output by the guider 140 and transmits the acquired notification information to the terminal device 300.

The storage 160 may be realized by a hard disk drive (HDD), a flash memory, a random access memory (RAM), a read only memory (ROM), or the like. The storage 160 stores user information 162 and battery-related information 164. The user information 162 and the battery-related information 164 may be stored in a cloud.

The user information 162 is a table format information in which user IDs, information indicating request details, battery type information, and information for identifying battery charge rates (%) are associated with each other.

FIG. 3 is a diagram showing an example of the user information. The user information 162 stores a user ID "0001," information indicating request details "power reception," battery type information "AAAA," and information for identifying a battery charge rate (%) "XX" associated with each other.

This information is stored based on a power reception request transmitted from a power receiving vehicle.

The user information 162 stores a user ID "0002," information indicating request details "power supply," battery type information "BBBB," and information for identifying a battery charge rate (%) "YY" associated with each other. This information is stored based on a power supply request transmitted from a power supplying vehicle.

The user information 162 stores a user ID "0003," information indicating request details "-," battery type information "CCCC," and information for identifying a battery charge rate (%) "ZZ" associated with each other. This information is stored based on battery charge rate notification information periodically transmitted by a vehicle 200. Because the battery charge rate notification information does not include information indicating that power reception or power supply is requested, request details are not stored.

The battery-related information 164 is table format information in which battery type information, information indicating a material of a corresponding battery, information indicating a material of a battery that can receive power, and information indicating a material of a battery that can supply power are associated. A material of a battery that can receive power refers to a material of the positive electrode of the battery, and examples thereof include $LiyNiO_2$, $LiyCoO_2$, $LiyV_2O_5$, $LiyFePO_4$, $LiyMn_2O_4$, $Li(1-y)Mn_2O_4$, $LiyTiS_2$, $LiyWO_3$, $NayCoO_2$, and the like.

FIG. 4 is a diagram showing an example of the battery-related information. The battery-related information 164 stores battery type information "AAAA," information indicating a material of the battery "material 1," information indicating materials of a battery that can receive power "material 1, material 3," and information indicating materials of a battery that can supply power "material 1, material 2" in association. The battery-related information 164 stores battery type information "BBBB," information indicating a material of the battery "material 2," information indicating materials of a battery that can receive power "material 2, material 4," and information indicating materials of a battery that can supply power "material 1, material 2" in association.

Figure 5:
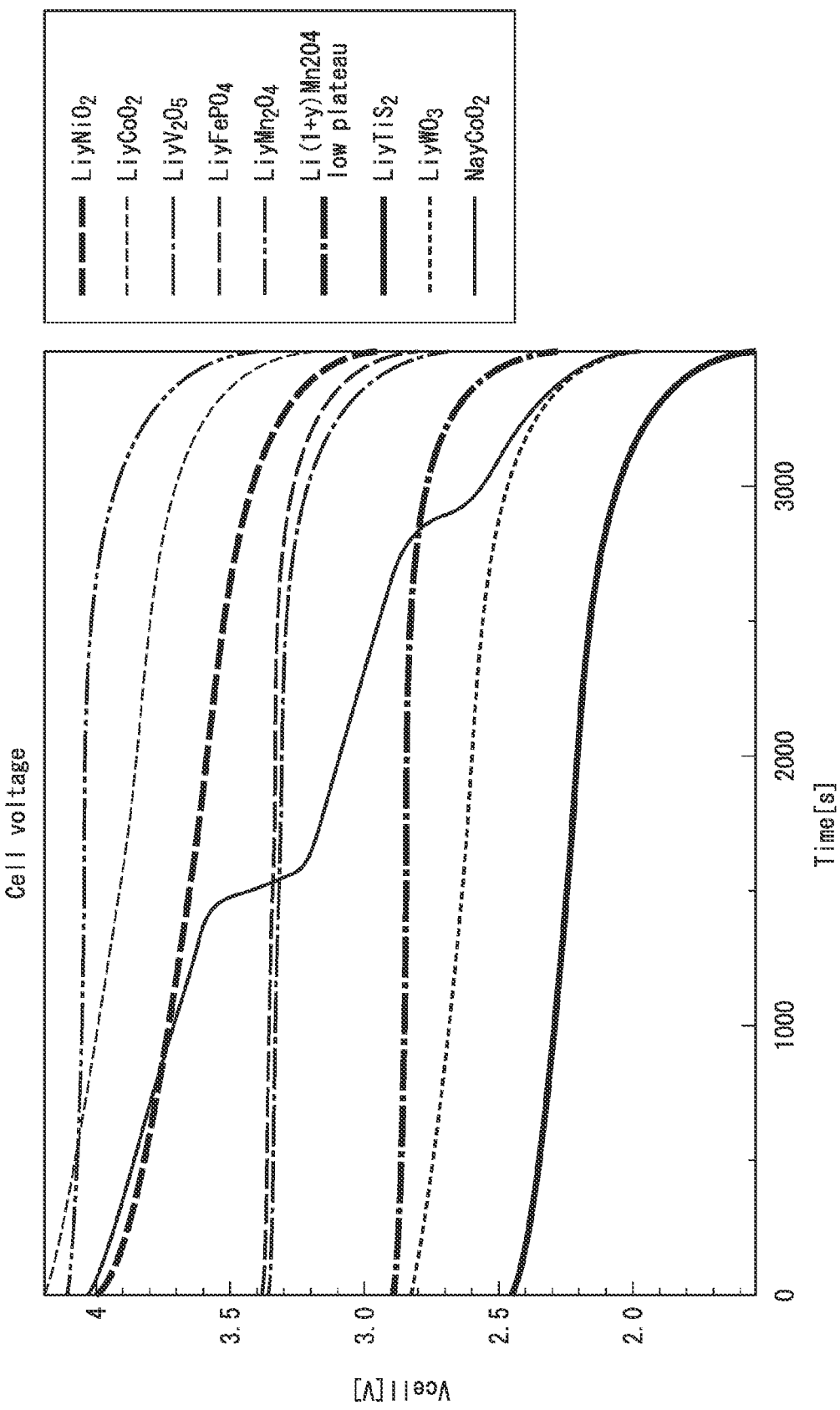
FIG. 5 shows an example of voltage characteristics of a battery.

FIG. 5 show an example of voltage characteristics of a battery. In FIG. 5, relationships between each material of a battery including $LiyNiO_2$, $LiyCoO_2$, $LiyV_2O_5$, $LiyFePO_4$, $LiyMn2O_4$, $Li(1-y)Mn_2O_4$, $LiyTiS_2$, $LiyWO_3$, and $NayCoO_2$, time, and voltage are shown. According to FIG. 5, because voltages and degrees of voltages decreasing over the time vary depending on the materials of the battery, it can be seen that there are cases in which power supply is possible and is not possible according to combinations of the materials of the battery. Description will be continued returning to FIG. 1.

The acquirer 120, the matching processor 130, and the guider 140 are realized by a hardware processor, for example, a central processing unit (CPU), or the like, executing a program (software) saved in the storage 160. Some or all of these functional units may be realized by hardware (a circuit unit including circuitry) such as a large-scale integration (LSI), an application specific integrated circuit (ASIC), a field-programmable gate array (FPGA), or a graphics processing unit (GPU) or may be realized by cooperation of software with hardware. The program may be saved in a storage device (a storage device with a non-transitory storage medium) such as a hard disk drive (HDD) or a flash memory in advance, or may be saved in a detachable storage medium (a non-transitory storage medium) such as a DVD or a CD-ROM, and may be installed when a storage medium is loaded into a drive device.

The acquirer 120 acquires battery charge rate notification information output by the communicator 110, associates the user ID, the battery type information, and the information for identifying a battery charge rate included in the acquired battery charge rate notification information, and registers the associated information in the user information 162 of the storage 160.

When the acquirer 120 acquires a power reception request output by the communicator 110 and the acquired power reception request includes the user ID and the information indicating a request for power reception and does not include the battery type information and information for identifying a battery charge rate, the acquirer registers "power reception" in the request details associated with the user ID in the information included in the user information 162 of the storage 160. The acquirer 120 outputs information including the user ID and indicating that the power reception has been requested (which will be referred to as "power reception request information" below) to the matching processor 130.

When the acquirer 120 acquires a power supply request output by the communicator 110 and the acquired power supply request includes the user ID and the information indicating a request for power supply and does not include the battery type information and information for identifying a battery charge rate, the acquirer registers "power supply" in the request details associated with the user ID in the information included in the user information 162 of the storage 160. The acquirer 120 outputs information including the user ID and indicating that the power supply has been requested (which will be referred to as "power supply request information" below) to the matching processor 130.

When the acquirer 120 acquires a power reception request output by the communicator 110 and the acquired power reception request includes the user ID, the information indicating a request for power reception, the battery type information, and the information for identifying a battery charge rate, the acquirer updates the information associated with the user ID in the information included in the user information 162 of the storage 160. The acquirer 120 outputs the power reception request information including the user ID and indicating that the power reception has been requested to the matching processor 130.

When the acquirer 120 acquires a power supply request output by the communicator 110 and the acquired power supply request includes the user ID, the information indicating a request for power supply, the battery type information, and the information for identifying a battery charge rate, the acquirer updates the information associated with the user ID in the information included in the user information 162 of the storage 160. The acquirer 120 outputs the power supply request information including the user ID and indicating that the power supply has been requested to the matching processor 130.

The acquirer 120 may delete information for which a predetermined period of time has passed out of the registered information.

The matching processor 130 matches a power receiving vehicle to a power supply vehicle based on the information registered in the user information 162 of the storage 160 and the information stored in the battery-related information 164. By matching the power receiving vehicle to the power supplying vehicle, the matching processor 130 selects the vehicle that can supply power to the power receiving vehicle. In other words, the matching processor 130 selects the vehicle to which the power supplying vehicle can supply power.

Figure 6:
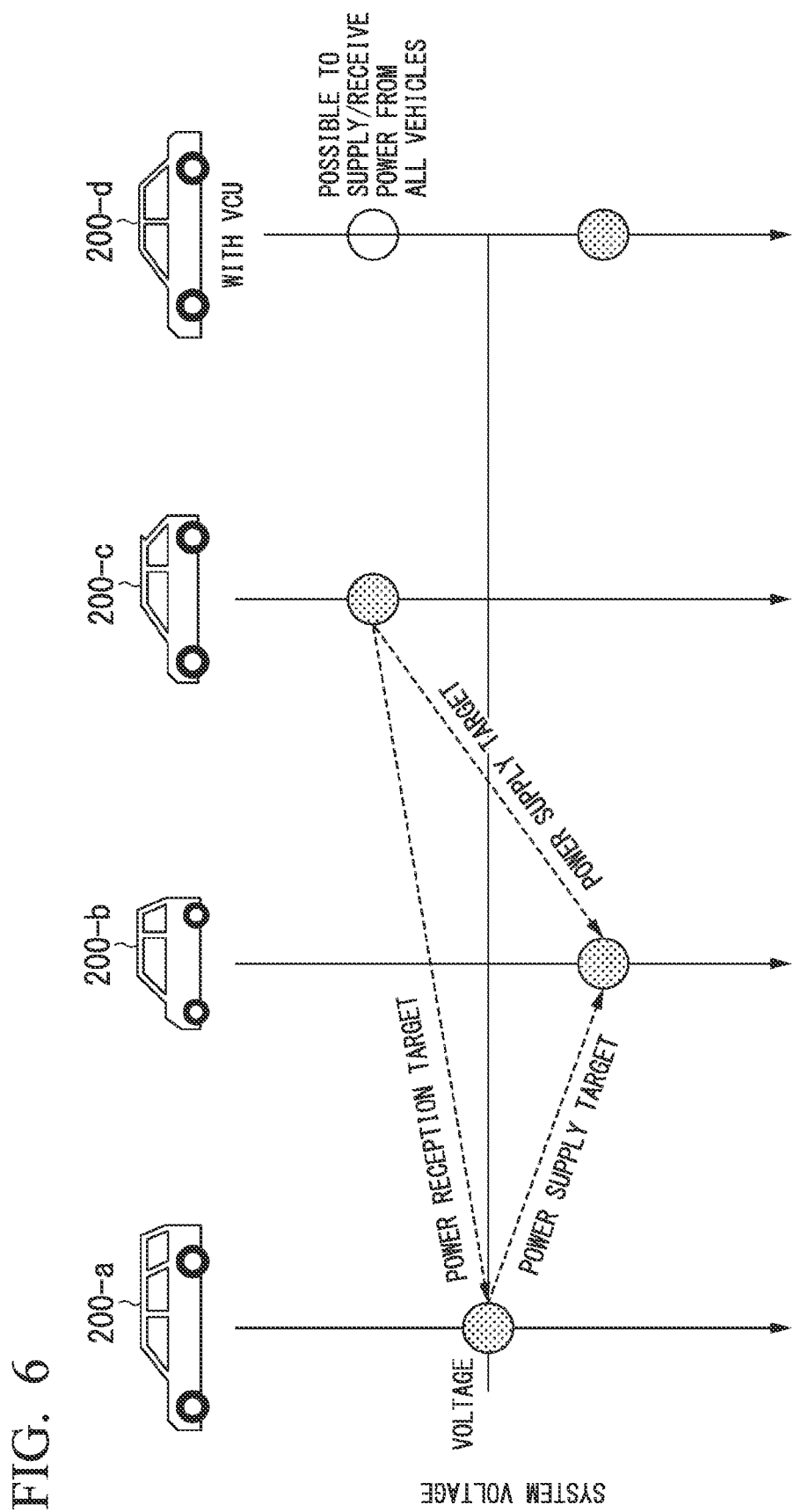
FIG. 6 is a diagram showing a relationship between a system voltage and power reception and power supply.

FIG. 6 is a diagram showing a relationship between a system voltage and power reception and power supply. A system voltage depends on a battery material and a battery charge rate. In FIG. 6, system voltages are represented by black circles.

Because the system voltage of the vehicle 200-$a$ is higher than the system voltage of the vehicle 200-$b$, power can be supplied from the vehicle 200-$a$ to the vehicle 200-$b$.

Because the system voltage of the vehicle 200-$a$ is lower than the system voltage of the vehicle 200-$c$, power can be supplied from the vehicle 200-$c$ to the vehicle 200-$a$. In other words, the vehicle 200-$a$ is a target receiving power from the vehicle 200-$c$.

Because the system voltage of the vehicle 200-$b$ is lower than the system voltage of the vehicle 200-$c$, power can be supplied from the vehicle 200-c to the vehicle 200-$b$.

The vehicle 200-$d$ is a vehicle in which a voltage controller (VCU) is mounted. The VCU is, for example, a DC-DC converter which boosts electric power supplied from the battery and outputs the electric power to a DC link DL. For this reason, the vehicle 200-$d$ can receive and supply power from and to the vehicle 200-$a$ to the vehicle 200-$c$. In the present embodiment, description will be continued on a case in which a vehicle 200 is not equipped with a VCU. A case in which a battery charge rate is used, instead of a system voltage will be continuously described. In other words, whether power supply is possible is determined based on a comparison result of battery charge rates.

Returning to FIG. 1, the matching processor 130 acquires power reception request information output by the acquirer 120 to acquire, from the user information 162, the battery type information and the information for identifying a battery charge rate associated with the user ID included in the acquired power reception request information.

The matching processor 130 acquires, from the battery-related information 164, information indicating a material of a battery that can supply power associated with the acquired battery type information. The matching processor 130 acquires, from the battery-related information 164, the acquired battery type information of the battery formed of the material of the battery that can supply power.

The matching processor 130 selects, among user IDs associated with the acquired battery type information in the user information 162, the user ID with the request details of power supply and a battery charge rate higher than a battery charge rate of the vehicle requesting power reception.

The matching processor 130 outputs the selected user ID to the guider 140. When there is no selectable user ID, the matching processor 130 outputs information indicating that there is no power supplying vehicle to the guider 140.

When the user ID output by the matching processor 130 is acquired, the guider 140 sets a device corresponding to the acquired user ID (the communication device 50 of the power supplying vehicle and the terminal device 300) as a destination, creates notification information including information indicating that there is a power receiving vehicle, and outputs the created notification information to the communicator 110. Furthermore, when the user ID output by the matching processor 130 is acquired, the guider 140 sets the device requesting power reception (the communication device 50 of the power receiving vehicle and the terminal device 300) as a destination, creates notification information including information for viewing a list of power supplying vehicles, and outputs the created notification information to the communicator 110. An example of the notification information is a web page.

When information indicating that there is no power supplying vehicle output by the matching processor 130 is acquired, the guider 140 sets the device requesting power reception (the communication device 50 of the power receiving vehicle and the terminal device 300) as a destination, creates notification information including information indicating that there is no power supplying vehicle, and outputs the created notification information to the communicator 110. An example of the notification information is a web page.

The matching processor 130 acquires power supply request information output by the acquirer 120 to acquire, from the user information 162, the battery type information and the information for identifying a battery charge rate associated with the user ID included in the acquired power supply request information.

The matching processor 130 acquires, from the battery-related information 164, information indicating a material of a battery that can receive power associated with the acquired battery type information. The matching processor 130 acquires, from the battery-related information 164, the acquired battery type information of the battery formed of the acquired material of the battery that can receive power.

The matching processor 130 selects, among user IDs associated with the acquired battery type information in the user information 162, the user ID with the request details of power reception and a battery charge rate lower than a battery charge rate of the vehicle requesting power supply.

The matching processor 130 outputs the selected user ID to the guider 140. When there is no selectable user ID, the matching processor 130 outputs information indicating that there is no power receiving vehicle to the guider 140.

When the user ID output by the matching processor 130 is acquired, the guider 140 sets a device corresponding to the acquired user ID (the communication device 50 of the power receiving vehicle and the terminal device 300) as a destination, creates notification information including information indicating that there is a power supplying/receiving vehicle, and outputs the created notification information to the communicator 110. Furthermore, when the user ID output by the matching processor 130 is acquired, the guider 140 sets the device requesting power supply (the communication device 50 of the power supplying vehicle and the terminal device 300) as a destination, creates notification information including information for viewing a list of power receiving vehicles, and outputs the created notification information to the communicator 110. An example of the notification information is a web page.

When information indicating that there is no power receiving vehicle output by the matching processor 130 is acquired, the guider 140 sets the device requesting power supply (the communication device 50 of the power supplying vehicle and the terminal device 300) as a destination, creates notification information including information indicating that there is no power receiving vehicle, and outputs the created notification information to the communicator 110. An example of the notification information is a web page.

(Operation of Vehicle System)

Figure 7:
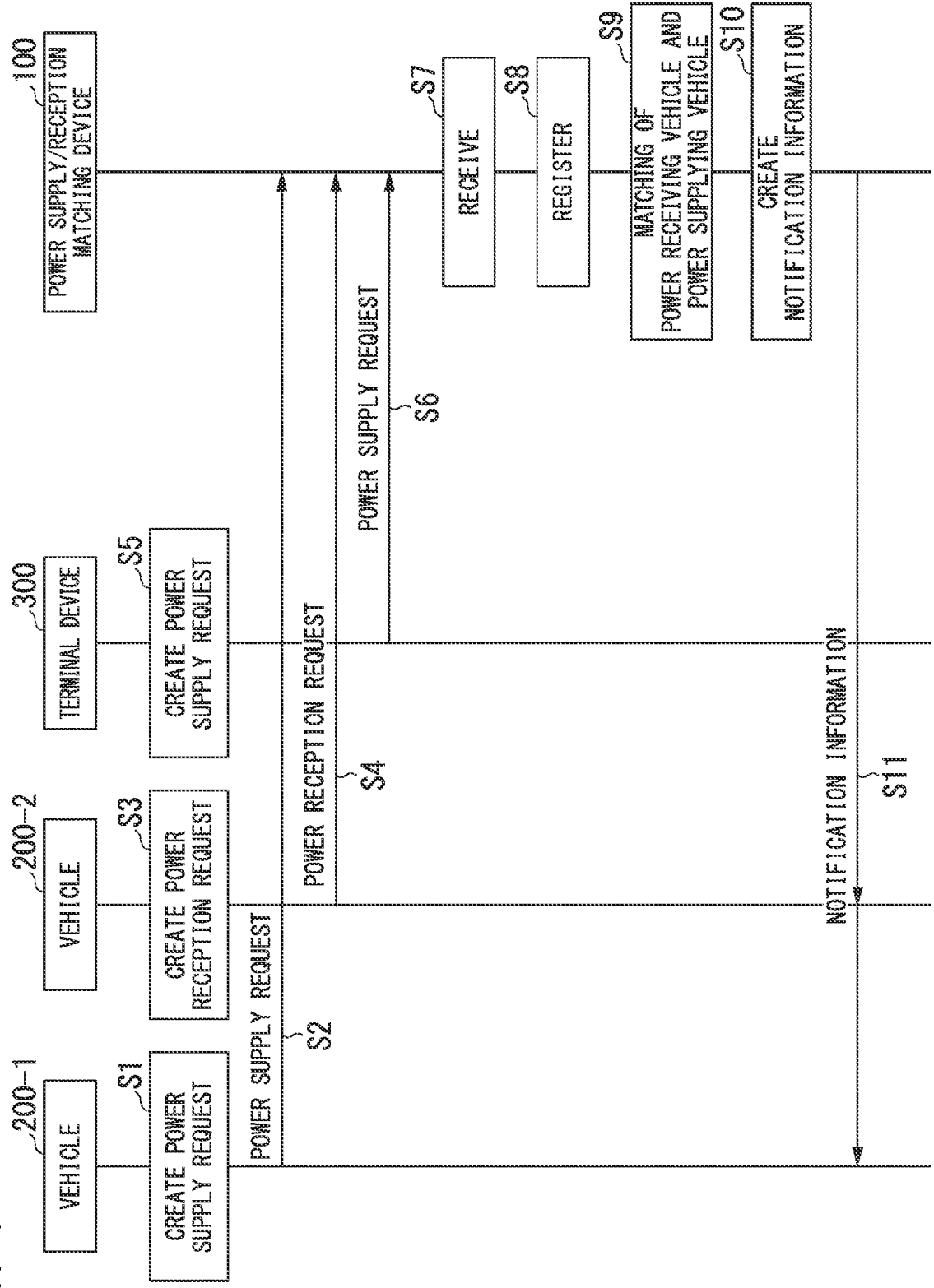
FIG. 7 is a sequence chart showing an example of an operation of the vehicle system according to an embodiment.

FIG. 7 is a sequence chart showing an example of an operation of the vehicle system according to an embodiment. In the example shown in FIG. 7, it is assumed that, when a power receiving vehicle is notified of the fact that there is a vehicle that can receive power, it can specify the vehicle that can receive power in, for example, inter-vehicle communication, or the like, and when a power supplying vehicle is notified of the fact that there is a vehicle that can supply power, it can specify the vehicle that can supply power in inter-vehicle communication, or the like.

The power supply/reception requester 38 of the vehicle 200-1 acquires a power supply request signal output by the operator 80 when the user U of the vehicle 200-1 makes an operation to request power supply on the operator 80. The power supply/reception requester 38 creates a power supply request that includes the user ID, the information indicating a request for power supply, the battery type information, and the information for identifying a battery charge rate and is destined for the power supply/reception matching device 100 based on the acquired power supply request signal (step S1).

The power supply/reception requester 38 outputs the created power supply request to the communication device 50. The communication device 50 acquires the power supply request output by the power supply/reception requester 38 and transmits the acquired power supply request to the power supply/reception matching device 100 (step S2).

The power supply/reception requester 38 of the vehicle 200-2 acquires a power reception request signal output by the operator 80 when the user U of the vehicle 200-2 makes an operation to request power reception on the operator 80. The power supply/reception requester 38 creates a power reception request that includes the user ID, the information indicating a request for power reception, the battery type information, and the information for identifying a battery charge rate and is destined for the power supply/reception matching device 100 based on the acquired power reception request signal (step S3).

The power supply/reception requester 38 outputs the created power reception request to the communication device 50. The communication device 50 acquires the power reception request output by the power supply/reception requester 38 and transmits the acquired power reception request to the power supply/reception matching device 100 (step S4).

The terminal device 300 creates a power supply request that includes the user ID and information indicating a request for power supply and is destined for the power supply/reception matching device 100 according to an operation of the user U (step S5).

The terminal device 300 transmits the created power supply request to the power supply/reception matching device 100 (step S6).

The communicator 110 of the power supply/reception matching device 100 receives the power supply request transmitted by the vehicle 200-1, the power reception request transmitted by the vehicle 200-2, and the power supply request transmitted by the terminal device 300 (step S7).

The communicator 110 outputs the received power supply request from the vehicle 200-1, power reception request from the vehicle 200-2, and power supply request from the terminal device 300 to the acquirer 120.

The acquirer 120 acquires the power supply request from the vehicle 200-1 output by the communicator 110, associates the user ID, the information indicating the request for power supply, the battery type information, and the information for identifying a battery charge rate included in the acquired power supply request, and registers the associated information in the user information 162 of the storage 160. The acquirer 120 outputs the power supply request information including the user ID and indicating that the power supply has been requested to the matching processor 130.

The acquirer 120 acquires the power reception request from the vehicle 200-2 output by the communicator 110, associates the user ID, the information indicating the request for power reception, the battery type information, and the information for identifying a battery charge rate included in the acquired power reception request, and registers the associated information in the user information 162 of the storage 160. The acquirer 120 outputs the power reception request information including the user ID and indicating that the power reception has been requested to the matching processor 130.

The acquirer 120 acquires the power supply request from the terminal device 300 output by the communicator 110 and registers "power supply" in the request details associated with the user ID in the information included in the user information 162 of the storage 160 based on the user ID and the information indicating the request for power supply included in the acquired power supply request. The acquirer 120 outputs the power reception request information including the user ID and indicating that the power reception has been requested to the matching processor 130 (step S8).

The matching processor 130 acquires the power reception request information and the power supply request information output by the acquirer 120 and matches a power receiving vehicle to a power supply vehicle based on the user IDs included in each of the acquired power reception request information and power supply request information, the information registered in the user information 162 of the storage 160, and the information stored in the battery-related information 164 (step S9).

A case in which the matching processor 130 can select the vehicle 200-1 that can supply power to the vehicle 200-2 requesting power reception will be continuously described.

When the vehicle 200-1 that can supply power is selected, the matching processor 130 outputs the user ID of the vehicle 200-1 that can supply power to the guider 140. The guider 140 acquires the user ID output by the matching processor 130, sets the vehicle 200-1 corresponding to the acquired user ID as a destination, and creates notification information including information indicating the vehicle 200-2 that is a power supply target.

Furthermore, when the user ID output by the matching processor 130 is acquired, the guider 140 sets the vehicle 200-2 requesting power reception as a destination, and creates notification information including information for viewing a list of vehicles capable of supplying power (step S10).

The guider 140 outputs the created notification information to the communicator 110. The communicator 110 acquires the notification information output by the guider 140 and transmits the acquired notification information (step S11).

The communication device 50 of the vehicle 200-1 receives the notification information transmitted by the power supply/reception matching device 100 and outputs the received notification information to the display device 60. The display controller 64 of the display device 60 acquires the notification information output by the communication device 50 and causes the display 62 to display the information indicating the vehicle 200-2 that is a power supply target included in the acquired notification information.

The communication device 50 of the vehicle 200-2 receives the notification information transmitted by the power supply/reception matching device 100 and outputs the received notification information to the display device 60. The display controller 64 of the display device 60 acquires the notification information output by the communication device 50 and causes the display 62 to display the information for viewing a list of power supplying vehicles included in the acquired notification information.

Figure 8:
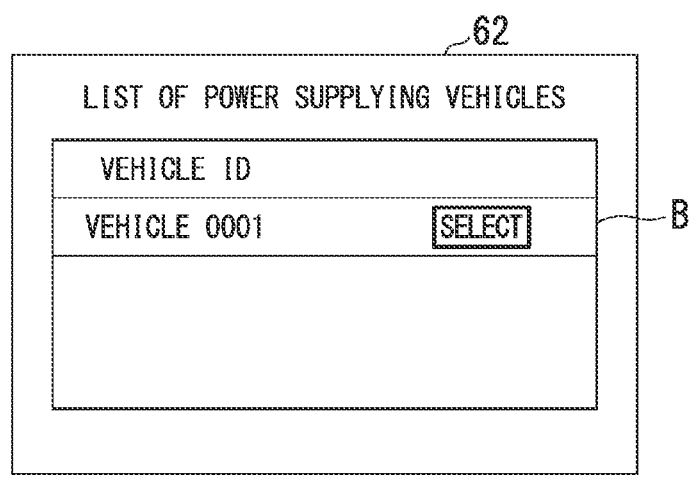
FIG. 8 is a diagram showing an example of a list of power supplying vehicles.

FIG. 8 is a diagram showing an example of a list of power supplying vehicles. As shown in FIG. 8, the display 62 displays a list of power receiving vehicles. The vehicle ID of the vehicle that can supply power and a selection button B are displayed on the list of power supplying vehicles. The user U presses the selection button B of the vehicle ID and thus can select a power supplying vehicle to ask for power supply.

In step S9 of the sequence chart shown in FIG. 7, when it is not possible to select a vehicle that can supply power, the matching processor 130 outputs information indicating that there is no vehicle that can supply power to the guider 140. When information indicating that there is no vehicle that can supply power output by the matching processor 130 is acquired, the guider 140 sets the vehicle 200-2 requesting power reception as a destination, creates notification information including the information indicating that there is no vehicle that can supply power, and outputs the created notification information to the communicator 110. The communicator 110 acquires the notification information output by the guider 140 and transmits the acquired notification information to the vehicle 200-2.

The communication device 50 of the vehicle 200-2 receives the notification information transmitted by the power supply/reception matching device 100 and outputs the received notification information to the display device 60. The display controller 64 of the display device 60 acquires the notification information output by the communication device 50 and causes the display 62 to display the information indicating that there is no vehicle that can supply power included in the acquired notification information.

Although the case in which the battery-related information 164 stores the battery type information, the information indicating a material of the battery, the information indicating materials of a battery that can receive power, and information indicating materials of a battery that can supply power in association has been described in the above-described embodiment, the invention is not limited to the example. For example, the battery-related information 164 may stores the battery type information and information indicating voltage characteristics of the battery in association with each other. An example of the information indicating voltage characteristics of a battery is shown in FIG. 5.

In this case, the matching processor 130 matches a power receiving vehicle to a power supply vehicle based on the information registered in the user information 162 of the storage 160 and the information stored in the battery-related information 164.

Specifically, the matching processor 130 acquires power reception request information output by the acquirer 120 to acquire, from the user information 162, the battery type information and the information for identifying a battery charge rate associated with the user ID included in the acquired power reception request information.

The matching processor 130 acquires, from the battery-related information 164, the information indicating voltage characteristics of the battery associated with the acquired battery type information. With respect to the acquired information indicating the voltage characteristics of the battery, the matching processor 130 acquires information of the type of the battery having higher voltage characteristics compared to the voltage characteristics of the battery from the battery-related information 164.

The matching processor 130 selects, among user IDs associated with the acquired battery type information in the user information 162, the user ID with the request details of power supply and a battery charge rate higher than a battery charge rate of the vehicle requesting power reception.

(Modified Example)

Figure 9:
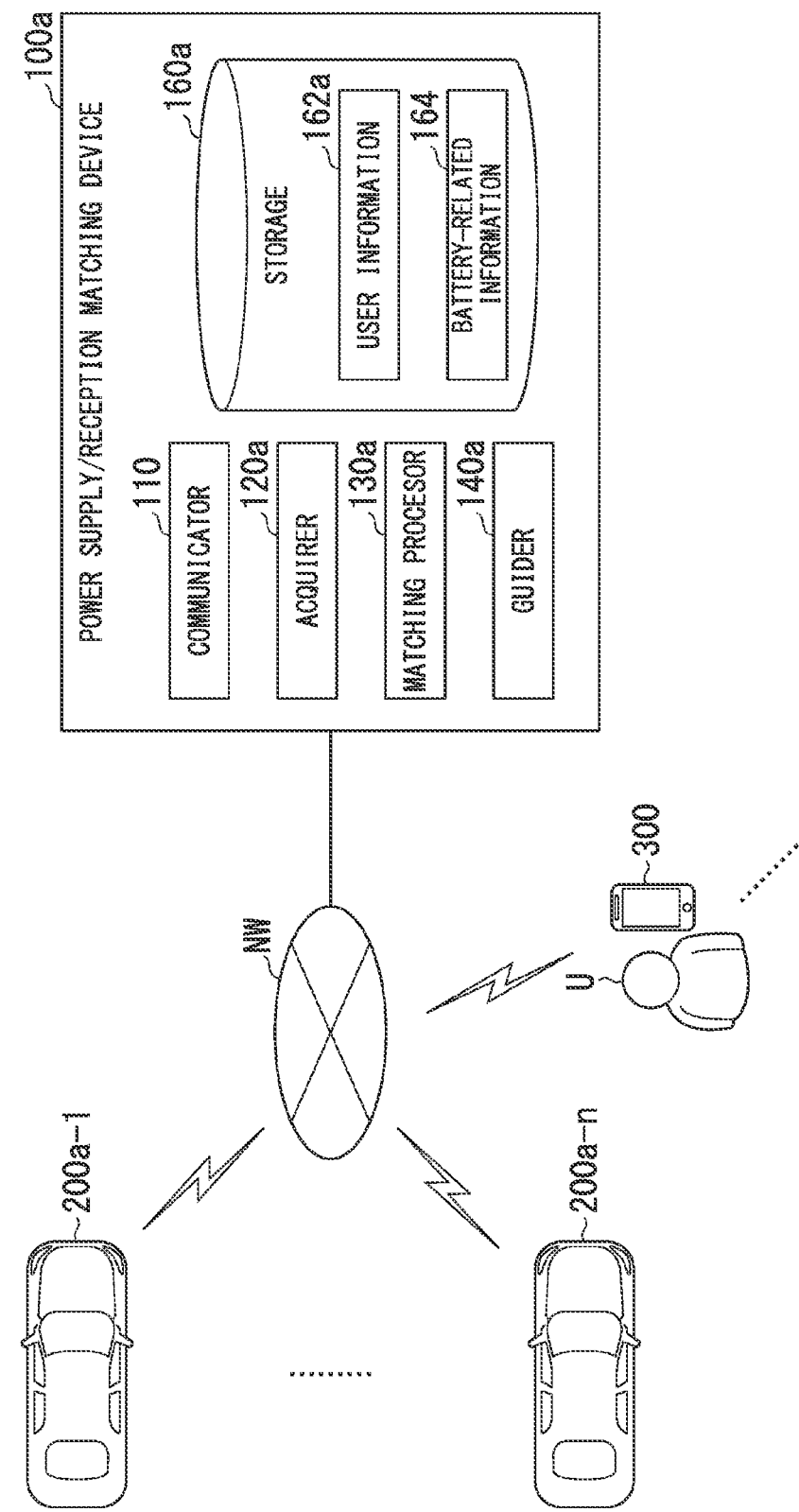
FIG. 9 is a configuration diagram of a vehicle system including a power supply/reception matching device according to a modified example of the embodiment.

FIG. 9 is a configuration diagram of a vehicle system including a power supply/reception matching device according to a modified example of the embodiment.

A vehicle system 1a according to a modified example of the embodiment includes a power supply/reception matching device 100a and a vehicle 200a-1 to a vehicle 200a-n (n is an integer satisfying n>1).

The power supply/reception matching device 100a and each of the vehicle 200a-1 to vehicle 200a-n can communicate with one another via a network NW.

In the vehicle system 1a, a power receiving vehicle transmits a power reception request including, in addition to the user ID, information indicating a request for power reception, battery type information, and information for identifying a battery charge rate, information indicating the type of the power receiving vehicle, position information of the power receiving vehicle, and information indicating an offered fee for electric power to be received. The information indicating an offered fee for electric power to be received is information indicating a fee for electric power to be received offered by the user U when requesting power reception.

A power supplying vehicle transmits a power supply request including, in addition to the user ID, information indicating a request for power supply, battery type information, and information for identifying a battery charge rate, information indicating the type of the power supplying vehicle, position information of the power supplying vehicle, and information indicating an offered fee for electric power to be supplied. The information indicating an offered fee for electric power to be supplied is information indicating a fee for electric power to be supplied offered by the user U when requesting power supply.

A terminal device 300 transmits a power supply request including, in addition to the user ID and information indicating a request for power supply, information indicating an offered fee for electric power to be supplied. The terminal device 300 transmits a power reception request including, in addition to the user ID and information indicating a request for power reception, information indicating an offered fee for electric power to be received.

The power supply/reception matching device 100a receives the power reception request transmitted by the power receiving vehicle, the power supply request transmitted by the power supplying vehicle, and the power reception request or the power supply request transmitted by the terminal device 300.

The power supply/reception requester 38 of a vehicle 200 acquires the position information of the vehicle 200 and periodically creates battery charge rate notification information that include the position information of the vehicle 200 in addition to a battery charge rate calculation result and the user ID and is destined for the power supply/reception matching device 100. The power supply/reception requester 38 outputs the created battery charge rate notification information to the communication device 50.

The power supply/reception matching device 100a matches the power receiving vehicle and the power supplying vehicle based on, in addition to the battery type information and the information for identifying the battery charge rate included in the power reception request transmitted by the power receiving vehicle, the battery type information and the information for identifying the battery charge rate included in the power supply request transmitted by the power supplying vehicle, and the battery type information and the information for identifying the battery charge rate of the power receiving vehicle acquired based on the user ID included in the power reception request or the battery type information and the information for identifying the battery charge rate of the power supplying vehicle acquired based on the user ID included in the power supply request, the requests being transmitted by the terminal device 300, the position information of the power receiving vehicle and the information indicating the offered fee for electric power to be received included in the power reception request transmitted by the power receiving vehicle, the position information of the power supplying vehicle and the information indicating the offered fee for electric power to be supplied included in the power supply request transmitted by the power supplying vehicle, and the information indicating the offered fee for electric power to be received and the position information of the power receiving vehicle acquired based on the user ID included in the power reception request or the information indicating the offered fee for electric power to be supplied and the position information of the power supplying vehicle acquired based on the user ID included in the power supply request, the requests being transmitted by the terminal device 300.

The terminal device 300, the vehicle 200a-1 to the vehicle 200a-n, and the power supply/reception matching device 100a included in the vehicle system 1a will be described in order below. An arbitrary vehicle among the vehicle 200a-1 to the vehicle 200a-n will be denoted by a vehicle 200a.

[Terminal Device 300]

The terminal device 300 accesses the power supply/reception matching device 100a and logs in to a power supply/reception matching website presented by the power supply/reception matching device 100a using its user ID. The power supply/reception matching device 100a is a server that is accessible through an application and functions as an application server or a web server. The terminal device 300a transmits a power reception request including a user ID, information indicating a request for power reception, and information indicating an offered fee for electric power to be received or a power supply request including a user ID, information indicating a request for power supply, and information indicating an offered fee for electric power to be supplied.

[Vehicle 200a]

Figure 10:
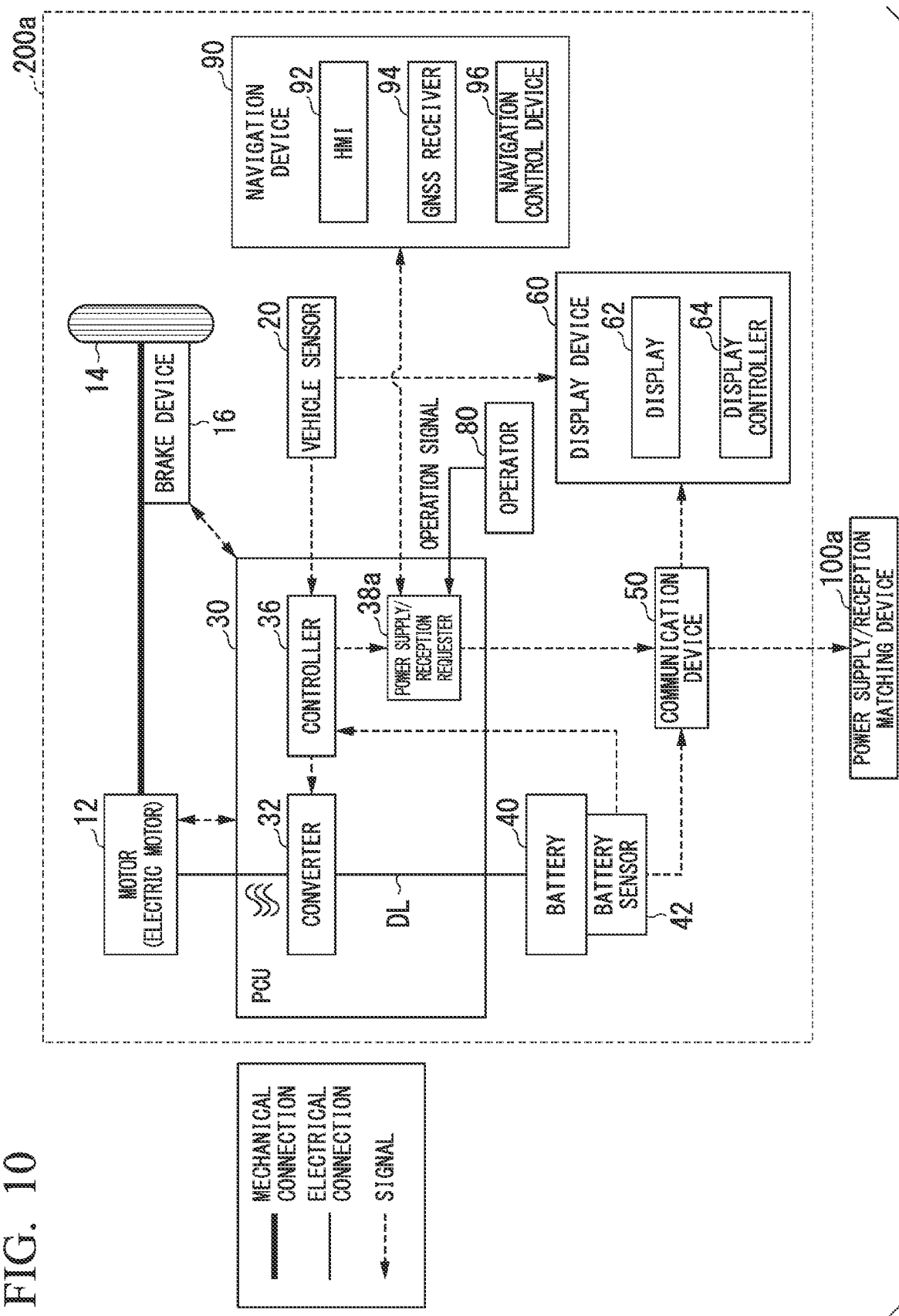
FIG. 10 is a diagram showing an example of a configuration of a vehicle according to a modified example of the embodiment.

FIG. 10 is a diagram showing an example of a configuration of a vehicle according to the modified example of embodiment. A vehicle 200a includes, for example, a motor 12, a drive wheel 14, a brake device 16, a vehicle sensor 20, a PCU 30, a battery 40, a battery sensor 42, a communication device 50, a display device 60, an operator 80, and a navigation device 90 as shown in FIG. 10.

The navigation device 90 includes, for example, a human-machine interface (HMI) 92, a global navigation satellite system (GNSS) receiver 94, and a navigation control device 96. The HMI 92 includes, for example, a touch panel-type display device, a speaker, a microphone, or the like. The GNSS receiver 94 measures a position of its own device (a position of the vehicle 200a) based on radio waves arriving from a GNSS satellite (e.g., a GPS satellite). The position of its own device is represented by, for example, longitude and latitude. The navigation control device 96 includes, for example, a CPU and various storage devices, and controls the entire navigation device 90. The storage device stores map information (a navigation map).

The navigation map is a map in which roads are represented by nodes and links. The navigation control device 96 determines a path to a destination specified using the HMI 92 from a position of the vehicle 200a measured by the GNSS receiver 94 with reference to the navigation map. The navigation control device 96 may transmit the position and the destination of the vehicle 200a to a navigation server (not shown) using the communication device 50 and acquire a path replied from the navigation server. In the modified example of the present embodiment, a path to a destination may be specified by the power supply/reception matching device 100a.

A power supply/reception requester 38a acquires the calculation result of a battery charge rate of the battery 40 output by the battery controller.

When a user U of the vehicle 200a makes an operation to request power reception on the operator 80 of the vehicle 200a, the operator 80 outputs a power reception request signal including information indicating the type of the power receiving vehicle and information indicating an offered fee for electric power to be received to the power supply/reception requester 38a. When an operation to request power reception is made, the user U offers a fee for electric power to be received.

When the user U of the vehicle 200a makes an operation to request power supply on the operator 80 of the vehicle 200, the operator 80 outputs a power supply request signal including information indicating the type of the power supplying vehicle and information indicating an offered fee for electric power to be supplied to the power supply/reception requester 38a. When an operation to request power supply is made, the user U offers a fee for electric power to be supplied.

When the power reception request signal output by the operator 80 is acquired, the power supply/reception requester 38a acquires position information of the vehicle 200a from the navigation device 90. The power supply/reception requester 38a creates a power reception request that includes the acquired position information of the vehicle 200a, the user ID, the information indicating a request for power reception, information indicating the type of the power receiving vehicle, the battery type information, the information for identifying the battery charge rate, and the information indicating the offered fee for electric power to be received and is destined for the power supply/reception matching device 100. The power supply/reception requester 38a outputs the created power reception request to the communication device 50.

When the power supply request signal output by the operator 80 is acquired, the power supply/reception requester 38a acquires position information of the vehicle 200a from the navigation device 90. The power supply/reception requester 38a creates a power supply request that includes the acquired position information of the vehicle 200a, the user ID, the information indicating a request for power supply, information indicating the type of the power supplying vehicle, the battery type information, the information for identifying the battery charge rate, and the information indicating the offered fee for electric power to be supplied and is destined for the power supply/reception matching device 100. The power supply/reception requester 38a outputs the created power supply request to the communication device 50. Returning to FIG. 9, a description will be continued.

[Power Supply/Reception Matching Device 100a]

The power supply/reception matching device 100a is realized by a device such as a personal computer, a server, an industrial computer, or the like. The power supply/reception matching device 100a includes, for example, a communicator 110, an acquirer 120a, a matching processor 130a, a guider 140a, and a storage 160a.

The storage 160a is realized by an HDD, a flash memory, a RAM, a ROM, or the like. The storage 160a stores user information 162a and battery-related information 164.

The user information 162a is a table format information in which user IDs, information indicating request details, position information, vehicle type information, battery type information, information for identifying a battery charge rate (%), and offered fees are associated with each other.

FIG. 11 is a diagram showing an example of the user information. The user information 162a stores a user ID "0001," information indicating request details "power reception," position information "(, )," vehicle type information "+++," battery type information "AAAA," information for identifying a battery charge rate (%) "XX," and an offered fee (information indicating an offered fee for electric power to be received) "---" associated with each other. This information is stored based on a power reception request transmitted from a power receiving vehicle.

The user information 162a stores a user ID "0002," information indicating request details "power supply," position information "(, )," vehicle type information "+++," battery type information "BBBB," information for identifying a battery charge rate (%) "YY," and an offered fee (information indicating an offered fee for electric power to be supplied "---" associated with each other. This information is stored based on a power supply request transmitted from a power supplying vehicle.

The user information 162a stores a user ID "0003," information indicating request details "-," position information "(, )," vehicle type information "+++," battery type information "CCCC," information for identifying a battery charge rate (%) "ZZ," and an offered fee "-" associated with each other. This information is stored based on battery charge rate notification information periodically transmitted by the vehicle 200. Because the battery charge rate notification information does not include information indicating that power reception or power supply is requested and information indicating an offered fee for electric power to be received or supplied, request details and an offered fee are not stored.

The acquirer 120*a*, the matching processor 130*a*, and the guider 140*a* are realized by a hardware processor, for example, a CPU or the like, executing a program (software) saved in the storage 160*a*. Some or all of these functional unit may be realized by hardware (circuit unit including circuitry) such as an LSI, an ASIC, an FPGA, or a GPU, or may be realized by cooperation of software with hardware. The program may be saved in a storage device (a storage device with a non-transitory storage medium) such as an HDD or a flash memory in advance or may be saved in a detachable storage medium (a non-transitory storage medium) such as a DVD or a CD-ROM and may be installed when a storage medium is loaded in a drive device.

The acquirer 120*a* acquires battery charge rate notification information output by the communicator 110, associates the user ID, the position information, the vehicle type information, the battery type information, and the information for identifying a battery charge rate included in the acquired battery charge rate notification information, and registers the associated information in the user information 162*a* of the storage 160*a*.

When the acquirer 120*a* acquires a power reception request output by the communicator 110 and the acquired power reception request includes the user ID, the information indicating a request for power reception, and the information indicating an offered fee for electric power to be received, and does not include the vehicle type information, the battery type information, and information for identifying a battery charge rate, the acquirer registers "power reception" in the request details associated with the user ID and registers the information indicating the offered fee for electric power to be received in the offered fee in the information included in the user information 162*a* of the storage 160*a*. The acquirer 120*a* outputs the power reception request information including the user ID and indicating that the power reception has been requested to the matching processor 130*a*.

When the acquirer 120*a* acquires a power supply request output by the communicator 110 and the acquired power supply request includes the user ID, the information indicating a request for power supply, and the information indicating the offered fee for electric power to be supplied and does not include the vehicle type information, the battery type information, and the information for identifying a battery charge rate, the acquirer registers "power supply" in the request details associated with the user ID and registers the information indicating the offered fee for electric power to be supplied in the offered fee in the information included in the user information 162*a* of the storage 160*a*. The acquirer 120*a* outputs the power supply request information including the user ID and indicating that power supply has been requested to the matching processor 130*a*.

When the acquirer 120*a* acquires a power reception request output by the communicator 110 and the acquired power reception request includes the user ID, the information indicating a request for power reception, the position information, the information indicating the type of the power receiving vehicle, the battery type information, the information for identifying a battery charge rate, and the information indicating an offered fee for electric power to be received, the acquirer updates the information associated with the user ID in the information included in the user information 162*a* of the storage 160*a*. The acquirer 120*a* outputs the power reception request information including the user ID and indicating that the power reception has been requested to the matching processor 130*a*.

When the acquirer 120*a* acquires a power supply request output by the communicator 110 and the acquired power supply request includes the user ID, the information indicating a request for power supply, the position information, the information indicating the type of the power supplying vehicle, the battery type information, the information for identifying a battery charge rate, and the information indicating an offered fee for electric power to be supplied, the acquirer updates the information associated with the user ID in the information included in the user information 162*a* of the storage 160*a*. The acquirer 120*a* outputs the power supply request information including the user ID and indicating that power supply has been requested to the matching processor 130*a*.

The acquirer 120*a* may delete information that has passed a predetermined period of time out of the registered information.

The matching processor 130*a* matches a power receiving vehicle to a power supply vehicle based on the information registered in the user information 162*a* of the storage 160*a* and the information stored in the battery-related information 164.

Specifically, the matching processor 130*a* acquires the power reception request information output by the acquirer 120*a* to acquire, from the user information 162*a*, the position information, the battery type information, the information for identifying the battery charge rate, and the offered fee associated with the user ID included in the acquired power reception request information.

The matching processor 130*a* acquires, from the battery-related information 164*a*, information indicating a material of the battery that can supply power associated with the acquired battery type information. The matching processor 130*a* acquires, from the battery-related information 164, the acquired battery type information of the battery formed of the acquired material of the battery that can supply power.

The matching processor 130*a* selects, among user IDs associated with the acquired battery type information in the user information 162*a*, the user ID with the request details of power supply and a battery charge rate higher than a battery charge rate of the vehicle requesting power reception.

When a user ID is selected, the matching processor 130*a* determines whether the distance between the vehicle associated with the user ID and the vehicle requesting power reception has a value less than or equal to a distance threshold based on the position information of the vehicle associated with the user ID and the position information of the vehicle requesting power reception. If the distance between the vehicle associated with the user ID and the vehicle requesting power reception has a value less than or equal to the distance threshold, the matching processor 130*a* selects a vehicle associated with the user ID. If the distance between the vehicle associated with the user ID and the vehicle requesting power reception has a value greater than the distance threshold, the matching processor 130*a* does not select a vehicle associated with the user ID.

Furthermore, when a user ID is selected, the matching processor 130*a* determines whether the offered fee for electric power to be supplied associated with the user ID is lower than or equal to the offered fee for electric power to be received based on the information indicating the offered fee for electric power to be supplied associated with the user ID and information indicating the offered fee for electric power to be received by the vehicle requesting power reception. If the offered fee for electric power to be supplied associated with the user ID is lower than or equal to the offered fee for electric power to be received, the matching processor 130*a* selects the vehicle associated with the user ID. If the offered fee for electric power to be supplied associated with the user ID is higher than the offered fee for electric power to be received, the matching processor 130*a* does not select the vehicle associated with the user ID.

The matching processor 130*a* outputs the user ID, the position information, the vehicle type information, and the offered fee of the selected vehicle to the guider 140*a*. If no vehicle is selected, the matching processor 130*a* outputs information indicating that there is no vehicle capable of supplying power to the guider 140*a*.

The guider 140*a* specifies the location corresponding to the position information when the user ID, the position information, the vehicle type information, and the offered fee output by the matching processor 130*a* are acquired. The guider 140*a* sets the device corresponding to the acquired user ID (the communication device 50 of the power supplying vehicle and the terminal device 300) as a destination, creates notification information including the specified location information, the vehicle type information, information indicating that there is a vehicle capable of receiving power, and the offered fee, and outputs the created notification information to the communicator 110.

An example of the notification information is a web page. Furthermore, the guider 140*a* specifies the location corresponding to the position information when the user ID, the position information, the vehicle type information, and the offered fee output by the matching processor 130*a* are acquired. The guider 140*a* sets the device requesting power reception (the communication device 50 of the power receiving vehicle and the terminal device 300) as a destination, creates notification information including information for viewing a list of power supplying vehicles, and outputs the created notification information to the communicator 110. The information for viewing the list of power supplying vehicles includes profile information of the power supplying vehicles such as locations of the power supplying vehicles, types of the power supplying vehicles, and offered fees in addition to power supplying vehicle IDs. An example of the notification information is a web page.

When information indicating that there is no power supplying vehicle output by the matching processor 130*a* is acquired, the guider 140*a* sets the device requesting power reception (the communication device 50 of the power receiving vehicle and the terminal device 300) as a destination, creates notification information including the information indicating that there is no power supplying vehicle, and outputs the created notification information to the communicator 110. An example of the notification information is a web page.

The matching processor 130*a* acquires the power supply request information output by the acquirer 120*a* to acquire, from the user information 162*a*, the position information, the battery type information, the information for identifying the battery charge rate, and the offered fee associated with the user ID included in the acquired power supply request information.

The matching processor 130*a* acquires, from the battery-related information 164*a*, information indicating a material of the battery that can receive power associated with the acquired battery type information. The matching processor 130*a* acquires, from the battery-related information 164, the acquired battery type information of the battery formed of the acquired material of the battery that can receive power.

The matching processor 130*a* selects, among user IDs associated with the acquired battery type information in the user information 162*a*, the user ID with the request details of power reception and a battery charge rate lower than a battery charge rate of a vehicle requesting power supply.

When the user ID is selected, the matching processor 130*a* determines whether the distance between the vehicle associated with the user ID and the vehicle requesting power supply has a value less than or equal to a distance threshold based on the position information of the vehicle associated with the user ID and the position information of the vehicle requesting power supply. If the distance between the vehicle associated with the user ID and the vehicle requesting power supply has a value less than or equal to the distance threshold, the matching processor 130*a* selects the vehicle associated with the user ID. If the distance between the vehicle associated with the user ID and the vehicle requesting power supply has a value greater than the distance threshold, the matching processor 130*a* does not select the vehicle associated with the user ID.

Furthermore, when the user ID is selected, the matching processor 130*a* determines whether the offered fee for electric power to be received associated with the user ID is higher than the offered fee for electric power to be supplied based on the information indicating the offered fee for electric power to be received associated with the user ID and the information indicating the offered fee for electric power to be supplied by the vehicle requesting power supply. If the offered fee for electric power to be received associated with the user ID is equal to or higher than the offered fee for electric power to be supplied, the matching processor 130*a* selects the vehicle associated with the user ID. If the offered fee for electric power to be received associated with the user ID is lower than the offered fee for electric power to be supplied, the matching processor 130*a* does not select the vehicle associated with the user ID.

The matching processor 130*a* outputs the user ID, the position information, the vehicle type information, and the offered fee of the selected vehicle to the guider 140*a*.

If no vehicle is selected, the matching processor 130*a* outputs information indicating that there is no vehicle capable of receiving power to the guider 140*a*.

The guider 140*a* specifies the location corresponding to the position information when the user ID, the position information, the vehicle type information, and the offered fee output by the matching processor 130*a* are acquired. The guider 140*a* sets the device corresponding to the acquired user ID (the communication device 50 of the power receiving vehicle and the terminal device 300) as a destination, creates notification information including the specified location information, the vehicle type information, information indicating that there is a vehicle capable of receiving power, and the offered fee, and outputs the created notification information to the communicator 110.

An example of the notification information is a web page. Furthermore, the guider 140*a* specifies the location corresponding to the position information when the user ID, the position information, the vehicle type information, and the offered fee output by the matching processor 130*a* are acquired. The guider 140*a* sets the device requesting power supply (the communication device 50 of the power supplying vehicle and the terminal device 300) as a destination, creates notification information including information for viewing a list of power receiving vehicles, and outputs the created notification information to the communicator 110. An example of the notification information is a web page. The information for viewing the list of power receiving vehicles includes profile information of the power supplying vehicles such as locations of the power receiving vehicles, types of the power supplying vehicles, and offered fees in addition to power receiving vehicles' IDs.

When information indicating that there is no power receiving vehicle output by the matching processor 130a is acquired, the guider 140a sets the device requesting power supply (the communication device 50 of the power supplying vehicle and the terminal device 300) as a destination, creates notification information including information indicating that there is no power receiving vehicle, and outputs the created notification information to the communicator 110. An example of the notification information is a web page.

FIG. 7 can be applied to the operation of the vehicle system 1a. However, in step S8, the acquirer 120a acquires a power supply request from the vehicle 200a-1 output by the communicator 110, associates the user ID, the information indicating the request for power supply, the position information, the vehicle type information, the battery type information, the information for identifying a battery charge rate, and the offered fee included in the acquired power supply request with each other, and registers the associated information in the user information 162a of the storage 160a. The acquirer 120a outputs the power supply request information including the user ID and indicating that power supply has been requested to the matching processor 130.

The acquirer 120a acquires a power reception request from the vehicle 200a-2 output by the communicator 110, associates the user ID, the information indicating the request for power reception, the position information, the vehicle type information, the battery type information, the information for identifying a battery charge rate, and the offered fee included in the acquired power reception request with each other, and registers the associated information in the user information 162a of the storage 160a. The acquirer 120a outputs the power reception request information including the user ID and indicating that power reception has been requested to the matching processor 130.

The acquirer 120a acquires the power supply request from the terminal device 300 output by the communicator 110, registers "power supply" in the request details associated with the user ID and registers the information indicating the offered fee for electric power to be supplied in the offered fee in the information included in the user information 162 of the storage 160 based on the user ID, the information indicating the request for power supply, and the offered fee for electric power to be supplied included in the acquired power supply request.

In step S9, the matching processor 130a acquires the power reception request information and the power supply request information output by the acquirer 120a and matches the power receiving vehicle to the power supplying vehicle based on the user IDs included in each of the acquired power reception request information and power supply request information, the information registered in the user information 162 of the storage 160, and the information stored in the battery-related information 164.

In step S10, when the vehicle 200a-1 that can supply power is selected, the matching processor 130a outputs the user ID of the vehicle 200a-1 that can supply power, the position information, the vehicle type information, and the information indicating the offered fee to the guider 140a. The guider 140a acquires the user ID, the position information, the vehicle type information, and the information indicating the offered fee output by the matching processor 130a, sets the vehicle 200a-1 corresponding to the acquired user ID as a destination, and creates notification information including information indicating the vehicle 200a-2 that is a power supply target, the position information, the vehicle type information, and the information indicating the offered fee. Furthermore, when the user ID output by the matching processor 130a is acquired, the guider 140 sets the vehicle 200a-2 requesting power reception as a destination, and creates notification information including information for viewing a list of power supplying vehicles, and profile information of the power supplying vehicles such as position information, vehicle type information, and offered fees of the power supplying vehicles.

In step S11, the guider 140a outputs the created notification information to the communicator 110. The communicator 110 acquires the notification information output by the guider 140a and transmits the acquired notification information.

The communication device 50 of the vehicle 200a-1 receives the notification information transmitted by the power supply/reception matching device 100a and outputs the received notification information to the display device 60. The display controller 64 of the display device 60 acquires the notification information output by the communication device 50 and causes the display 62 to display the information for viewing power receiving vehicles included in the acquired notification information. The information for viewing power receiving vehicles includes the profile information of the power receiving vehicles.

The communication device 50 of the vehicle 200a-2 receives the notification information transmitted by the power supply/reception matching device 100a and outputs the received notification information to the display device 60. The display controller 64 of the display device 60 acquires the notification information output by the communication device 50 and causes the display 62 to display the information for viewing a list of power supplying vehicles included in the acquired notification information. The list of power supplying vehicles includes the profile information of the power supplying vehicles.

FIG. 12 is a diagram showing an example of a list of power supplying vehicles. As shown in FIG. 12, the display 62 displays a list of power supplying vehicles. The list of power supplying vehicles includes a vehicle ID of a power supplying vehicle and profile information of the power supplying vehicle. The profile information of the power supplying vehicle includes location information of the power supplying vehicle, vehicle type information of the power supplying vehicle, and information indicating a fee for power supply offered by the power supplying vehicle. The list of power supplying vehicles further includes a selection button B. The user U presses the selection button B of the vehicle ID and thus can select a power supplying vehicle to ask for power supply.

In step S9 of the sequence chart shown in FIG. 7, when it is not possible to select a vehicle that can supply power, the matching processor 130a outputs information indicating that there is no vehicle that can supply power to the guider 140a. When the information indicating that there is no vehicle that can supply power output by the matching processor 130a is acquired, the guider 140a sets the vehicle 200a-2 requesting power reception as a destination, creates notification information including the information indicating that there is no vehicle that can supply power, and outputs the created notification information to the communicator 110. The communicator 110 acquires the notification information output by the guider 140a and transmits the acquired notification information to the vehicle 200a-2.

The communication device 50 of the vehicle 200a-2 receives the notification information transmitted by the power supply/reception matching device 100a and outputs the received notification information to the display device 60. The display controller 64 of the display device 60 acquires the notification information output by the communication device 50 and causes the display 62 to display the information indicating that there is no vehicle that can supply power included in the acquired notification information.

Although the case in which the power supply/reception matching device 100a selects a power supplying vehicle based on the position information of the power receiving vehicle and the offered fee for electric power to be received in addition to the battery charge rate has been described in the modified example of the embodiment described above, the invention is not limited to this example. For example, the power supply/reception matching device 100a may select a power supplying vehicle based on the position information of the power receiving vehicle or the offered fee for electric power to be received in addition to the battery charge rate.

Although the case in which the power supply/reception matching device 100a selects a power receiving vehicle based on the position information of the power supplying vehicle and the offered fee for electric power to be supplied in addition to the battery charge rate has been described, the invention is not limited to this example. For example, the power supply/reception matching device 100a may select a power receiving vehicle based on the position information of the power supplying vehicle or the offered fee for electric power to be supplied in addition to the battery charge rate.

Although exemplary embodiments for implementing the present invention have been described above using the embodiments, the present invention is not limited to the embodiments at all, and various modifications and substitutions can be added thereto within a scope not departing from the gist of the present invention.

1,1a . . . Vehicle system
12 . . . Motor
14 . . . Drive wheel
16 . . . Brake device
20 . . . Vehicle sensor
30 . . . PCU
32 . . . Converter
36 . . . Controller
38 . . . Power supply/reception requester
40 . . . Battery
42 . . . Battery sensor
50 . . . Communication device
60 . . . Display device
62 . . . Display
64 . . . Display controller
80 . . . Operator
90 . . . Navigation device
92 . . . HMI
94 . . . GNSS receiver
96 . . . Navigation control device
100,100a . . . Power supply/reception matching device
110 . . . Communicator
120,120a . . . Acquirer
130,130a . . . Matching processor
140,140a . . . Guider
160,160a . . . Storage
162,162a . . . User information
164 . . . Battery-related information
200,200a . . . Vehicle
NW . . . Network

What is claimed is:

1. A power supply/reception matching device comprising:
a communicator;
an acquirer configured to acquire a power reception request or a power supply request including information for identifying a type and a charge rate of a battery through the communicator;
a matching processor configured to match a power supplying vehicle and a power receiving vehicle on the basis of the power reception request and the power supply request acquired by the acquirer; and
a guider configured to cause the communicator to transmit a processing result from the matching processor to devices of transmitters of the power reception request and the power supply request,
wherein the matching processor is further configured to match the power supplying vehicle and the power receiving vehicle on the basis of at least one of a material of a battery or voltage characteristics of a battery mounted in each of the power supplying vehicle and the power receiving vehicle.

2. The power supply/reception matching device according to claim 1, wherein the guider is configured to cause the communicator to transmit information for viewing a list of power supplying vehicles to the device of the transmitter of the power supply request.

3. The power supply/reception matching device according to claim 1, wherein the guider is configured to cause the communicator to transmit information for viewing profile information of power supplying vehicles to the device of the transmitter of the power supply request.

4. The power supply/reception matching device according to claim 1, wherein the matching processor is configured to match the power supplying vehicle and the power receiving vehicle further on the basis of position information of the power receiving vehicle and position information of the power supplying vehicle.

5. The power supply/reception matching device according to claim 1,
wherein the power reception request includes information indicating an offered fee for electric power to be received and the power supply request includes information indicating an offered fee for electric power to be supplied, and
wherein the matching processor is configured to match the power supplying vehicle and the power receiving vehicle further on the basis of the offered fee for electric power to be received included in the power reception request and the offered fee for electric power to be supplied included in the power supply request.

6. A power supply/reception matching method of a device including a communicator, the power supply/reception matching method comprising;
acquiring a power reception request or a power supply request including information for identifying a type and a charge rate of a battery through the communicator;
matching a power supplying vehicle and a power receiving vehicle on the basis of the acquired power reception request and power supply request; and
causing the communicator to transmit a processing result from the matching to devices of transmitters of the power reception request and the power supply request,
wherein the matching of the power supplying vehicle and the power receiving vehicle comprises matching the power supplying vehicle and the power receiving vehicle on the basis of at least one of a material of a battery or voltage characteristics of a battery mounted in each of the power supplying vehicle and the power receiving vehicle.

7. A computer-readable non-transitory storage medium that stores a program causing a computer of a device including a communicator to;
   acquire a power reception request or a power supply request including information for identifying a type and a charge rate of a battery through the communicator;
   match a power supplying vehicle and a power receiving vehicle on the basis of the acquired power reception request and power supply request; and
   cause the communicator to transmit a processing result from the matching to devices of transmitters of the power reception request and the power supply request,
   wherein the matching of the power supplying vehicle and the power receiving vehicle comprises matching the power supplying vehicle and the power receiving vehicle on the basis of at least one of a material of a battery or voltage characteristics of a battery mounted in each of the power supplying vehicle and the power receiving vehicle.

\* \* \* \* \*